(12) United States Patent
Choi et al.

(10) Patent No.: US 9,431,647 B2
(45) Date of Patent: Aug. 30, 2016

(54) SECONDARY BATTERY HAVING A SAFETY DEVICE

(71) Applicant: Hyundai Motor Company, Seoul (KR)

(72) Inventors: Sung Min Choi, Gyeongju-si (KR); Seung Ho Ahn, Seoul (KR); Hong Seok Min, Yongin-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 328 days.

(21) Appl. No.: 14/296,131

(22) Filed: Jun. 4, 2014

(65) Prior Publication Data

US 2015/0188118 A1    Jul. 2, 2015

(30) Foreign Application Priority Data

Dec. 30, 2013    (KR) .................... 10-2013-0167274

(51) Int. Cl.
  *H01M 2/34*    (2006.01)
  *H01M 2/26*    (2006.01)
  *H01M 2/02*    (2006.01)

(52) U.S. Cl.
  CPC ............ *H01M 2/345* (2013.01); *H01M 2/024* (2013.01); *H01M 2/26* (2013.01); *H01M 2/266* (2013.01); *H01M 2/0275* (2013.01); *H01M 2200/20* (2013.01); *H01M 2220/20* (2013.01)

(58) Field of Classification Search
  CPC ............ H01M 2/34; H01M 2/26; H01M 2/02
  See application file for complete search history.

(56) References Cited

U.S. PATENT DOCUMENTS

| | | | |
|---|---|---|---|
| 2006/0051660 A1* | 3/2006 | Chang | H01M 10/42 429/62 |
| 2012/0040235 A1* | 2/2012 | Cho | H01M 2/0207 429/156 |
| 2012/0107676 A1* | 5/2012 | Han | H01M 2/06 429/179 |

FOREIGN PATENT DOCUMENTS

| | | | | |
|---|---|---|---|---|
| JP | 08-162093 A | 6/1996 | | |
| JP | 10-294097 A | 11/1998 | | |
| JP | 2002-124236 | * 4/2002 | ............. H01M 2/12 |
| JP | 2002124236 A | 4/2002 | | |

(Continued)

OTHER PUBLICATIONS

Housing_Definition by Merriam-Webster, Pertinent Page: p. 1.*

(Continued)

*Primary Examiner* — Jonathan G Leong
*Assistant Examiner* — Seenam Agbetiafan
(74) *Attorney, Agent, or Firm* — McDermott Will & Emery LLP

(57) ABSTRACT

A high voltage battery for vehicles includes an electrode tab that is divided into a first part placed near a battery cell and a second part placed near a terminal. A pouch packages the battery cell therein. A housing is packaged in an interior of the pouch together with the battery cell and has an opening. A first part extension and a second part extension extend from the first part and the second part, respectively, that are inserted into the housing through the opening, and that come into contact with each other in the housing. A cushion is inserted in the housing and compresses the first part extension and the second part extension such that the first part extension and the second part extension come into close contact with each other.

8 Claims, 6 Drawing Sheets

(56) References Cited

FOREIGN PATENT DOCUMENTS

| | | |
|---|---|---|
| JP | 2004-303447 A | 10/2004 |
| JP | 2005-108469 A | 4/2005 |
| KR | 10-2006-0116424 A | 11/2006 |
| KR | 10-0874402 | 12/2008 |
| KR | 10-2009-0043717 A | 5/2009 |
| KR | 10-2012-0128552 A | 11/2012 |
| KR | 10-1264534 | 5/2013 |
| KR | 10-2013-0063754 A | 6/2013 |
| WO | WO 2013024963 * 2/2013 .............. H01M 2/10 |

OTHER PUBLICATIONS

Korean Office Action issued in Korean Application No. 10-2013-0167274, dated Jan. 26, 2014.
Korean Office Action issued in Korean Application No. 10-2013-0167274 dated Aug. 21, 2015.

* cited by examiner

SECONDARY BATTERY HAVING A SAFETY DEVICE

CROSS REFERENCE TO RELATED APPLICATION

The present application claims the benefit of priority to Korean Patent Application Number 10-2013-0167274 filed on Dec. 30, 2013, the entire contents of which application is incorporated herein for all purposes by this reference.

TECHNICAL FIELD

The present disclosure relates, in general, to a high voltage battery for vehicles which can realize safety of a pouch cell using a pouch type current interruptive device (CID), thereby improving marketability of batteries for the vehicles.

BACKGROUND

As an application of a pouch type lithium ion secondary battery has spread in recent years, energy density of batteries and energy storage capacity of a unit cell have gradually increased. Particularly, to meet the requirements brought from an increase in a vehicle mileage, it has been actively studied in recent years to find a technology that can increase the energy storage capacity of a lithium ion secondary battery for vehicles. However, according to the conventional pouch type lithium ion secondary battery, a sheath of the battery has a low physical strength, and the battery is not provided with a cell level safety device (CID, PTC, fuse, etc.), and thus, it is difficult to realize safety of a battery having a high energy storage capacity. Here, the technical term CID is an abbreviation of a current interruptive device and is used as an overcharge safety device. Particularly, when a vehicle battery is overcharged, gas is generated in the battery, and the temperature inside the battery increases, thereby thermal runaway may be induced in a material inside the battery which may result in a fire. Further, when an abnormal reaction is generated in even just one unit cell during an operation of a vehicle, an abnormal voltage may be easily induced in the battery pack, thereby reducing the driving safety of the vehicle.

The foregoing is intended merely to aid in the understanding of the background of the present disclosure, and is not intended to mean that the present disclosure falls within the purview of the related art that is already known to those skilled in the art.

SUMMARY

The present disclosure has been made keeping in mind the above problems occurring in the related art. An aspect of the present disclosure provides a high voltage battery for vehicles, which can realize safety of a pouch cell using a pouch type current interruptive device (CID, used as an overcharge safety device), thereby improving marketability of batteries for vehicles.

According to an exemplary embodiment of the present disclosure, a high voltage battery for vehicles includes an electrode tab that is divided into a first part disposed near a battery cell and a second part disposed near a terminal. An electrode tab is divided into a first part disposed near the battery cell and a second part disposed near the terminal. A pouch packages the battery cell therein. A housing is packaged in an interior of the pouch together with the battery cell and has an opening. A first part extension and a second part extension extend from the first part and the second part, respectively, are inserted into the housing through the opening, and come into contact with each other in the housing. A cushion is inserted in the housing and compresses the first part extension and the second part extension such that the first part extension and the second part extension come into close contact with each other.

The interior of the pouch may be vacuumized.

When the battery cell is expanded, gas may be generated in a space inside the pouch. When an internal pressure of the pouch is increased higher than an internal pressure of the cushion, the first part extension and the second part extension may be separated from each other.

The cushion may include two cushions that are inserted into an upper part and a lower part of the housing, respectively. The cushion compresses the first part extension and the second part extension such that the first part extension and the second part extension come into close contact with each other in a central portion of the housing.

The first part extension and the second part extension may be configured as panel-shaped parts that extend from the first part and the second part, respectively, to a side in parallel to each other such that respective ends thereof face each other.

The battery cell, the first part, the second part, and the housing may be packaged together by the pouch.

The first part extension, the second part extension and the opening of the housing may be provided with respective lockers, such that, when the first part extension and the second part extension are separated from each other, a locked state between the first part extension and the housing and a locked state between the second part extension and the housing are maintained without being released.

Another locker may be provided in a gap between the first part extension and the second part extension, such that, once the first part extension and the second part extension are separated from each other, a separated state of the first part extension and the second part extension can be maintained by the locker.

According to another embodiment of the present disclosure, a high voltage battery for vehicles includes an electrode tab that is divided into a first part disposed near a terminal and a second part disposed near a battery cell. A pouch packages the battery cell therein. A housing is packaged in an interior of the pouch together with the battery cell and has an opening. A first part extension and a second part extension extend from the first part and the second part, respectively, are inserted into the housing through the opening, and come into contact with each other in the housing. A cushion is inserted in the housing and compresses the first part extension and the second part extension such that the first part extension and the second part extension come into close contact with each other.

According to the high voltage battery for vehicles which has the above-mentioned construction, when the volume of a battery cell is abnormally expanded and a variation in the pressure inside the cell is induced, a circuit of the battery is physically opened at a pressure equal to or higher than a reference level, thereby interrupting an external electric current and inducing cut-off of the circuit, so the present disclosure can realize cell level safety and pack voltage safety.

Unlike the conventional pouch type battery, in which, to avoid overcharge, a safety device designed to be limitedly used in a unit of module or package pack is used, the present disclosure provides the overcharge safety device that can realize the cell level safety in the unit cell, and can interrupt an abnormal cell reaction in unit cells.

Further, the present disclosure adds the overcharge safety device in a surplus space between a jelly roll and a lead tab inside a pouch type unit cell, thereby realizing the cell level safety regardless of module type batteries or pack package type batteries.

BRIEF DESCRIPTION OF THE DRAWINGS

The above and other objects, features and other advantages of the present disclosure will be more clearly understood from the following detailed description when taken in conjunction with the accompanying drawings.

DETAILED DESCRIPTION

Hereinbelow, an exemplary embodiment of the present disclosure will be described in detail with reference to the accompanying drawings.

Figure 1:
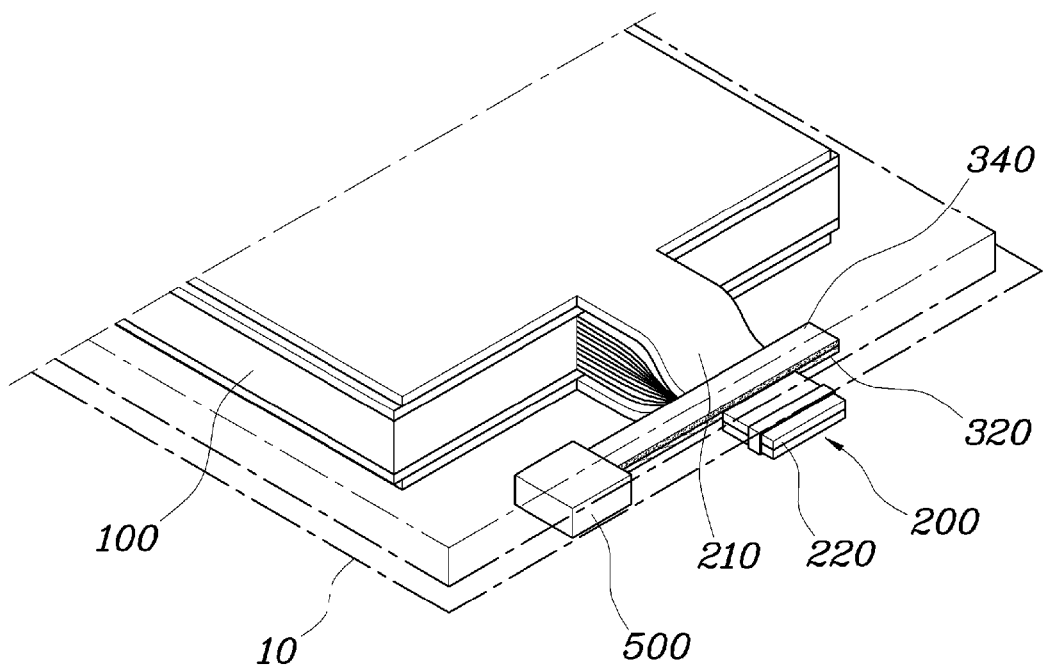
FIG. 1 is a perspective view illustrating a high voltage battery for vehicles according to an embodiment of the present disclosure.
Figure 2:
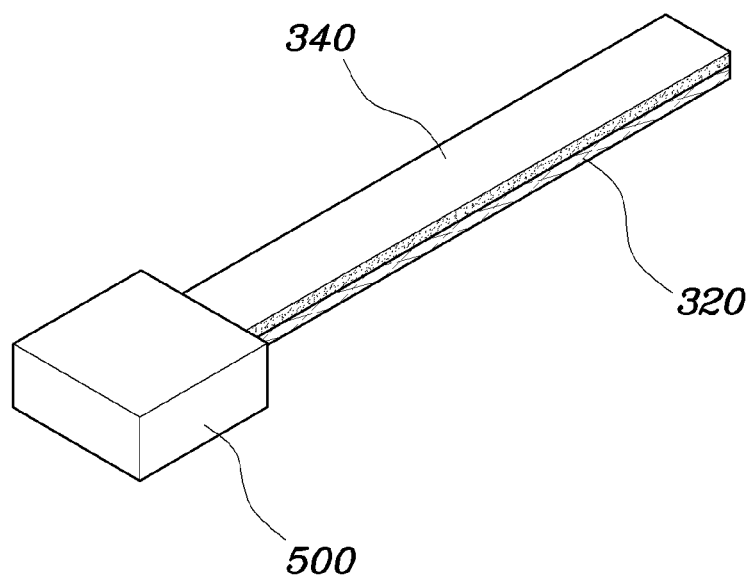
FIG. 2 is a perspective view illustrating a current interruptive device (CID) of a high voltage battery for vehicles according to an embodiment of the present disclosure.
Figure 3:
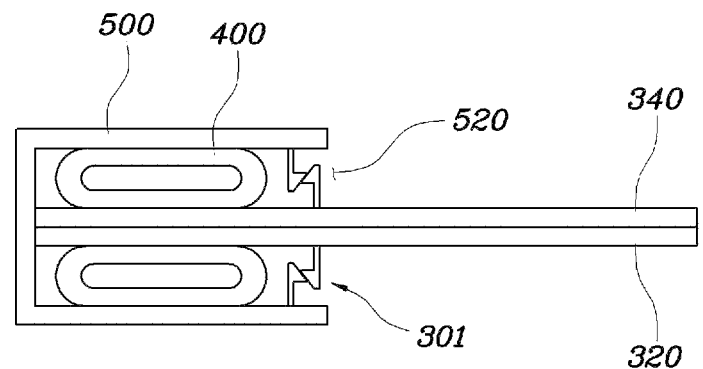
FIGS. 3 and 4 are sectional views illustrating an operation of a high voltage battery for vehicles according to an embodiment of the present disclosure.
Figure 4:
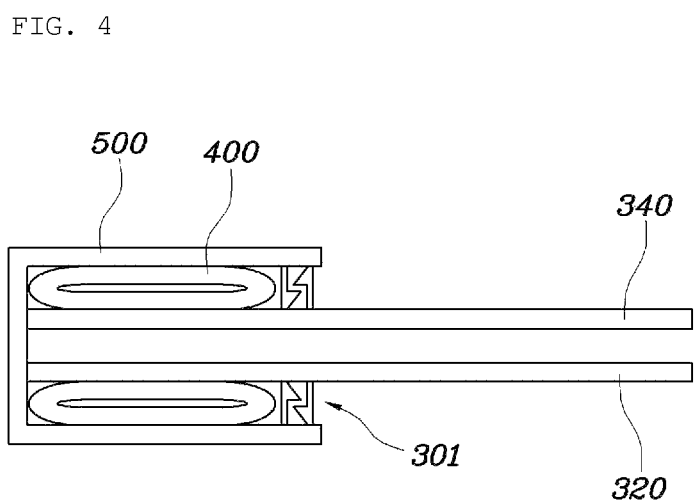

FIG. 1 is a view illustrating a high voltage battery for vehicles according to an embodiment of the present disclosure. FIG. 2 is a view illustrating a CID of a high voltage battery for vehicles according to an embodiment of the present disclosure. FIGS. 3 and 4 are views illustrating an operation of the high voltage battery for vehicles according to the embodiment of the present disclosure.

The present disclosure is provided so as to realize both cell level safety of a pouch cell and driving safety of a vehicle. The high voltage battery for vehicles according to an exemplary embodiment of the present disclosure includes an electrode tab 200 that is divided into a first part 210 disposed near a battery cell 100 and a second part 220 disposed near a terminal (not shown). A pouch 10 packages the battery cell 100 therein. A housing 500 is packaged in an interior of the pouch 10 together with the battery cell 100 and has an opening 520. A first part extension 320 and a second part extension 340 extend from the first part 210 and the second part 220, respectively, are inserted into the housing 500 through the opening 520, and come into contact with each other in the housing 500. A cushion 400 is inserted in the housing 500 and compresses the first part extension 320 and the second part extension 340 such that the first part extension 320 and the second part extension 340 come into close contact with each other.

As shown in FIG. 1, the electrode tab 200 of the present disclosure is divided into the first part 210 that is disposed near the battery cell and the second part 220 that is disposed near the terminal. In a normal state, the first part 210 and the second part 220 are brought into contact with each other by a current interruptive device (CID), so the battery can perform normal functions. However, when the battery cell 100 is expanded, the first part 210 and the second part 220 are separated from each other.

The battery cell 100 of FIG. 1 is packaged in the pouch 10. The interior of the pouch 10 may be vacuumized. Further, two cushions 400 may be inserted in the upper and lower parts of the housing 500, respectively, and may compress the first part extension 320 and the second part extension 340, such that the first part extension 320 and the second part extension 340 can come into close contact with each other in a central portion of the housing 500.

The first part extension 320 and the second part extension 340 are configured as panel-shaped parts that extend from the first part 210 and the second part 220, respectively, to a side in parallel to each other, such that respective ends 322 and 342 of the first and second part extensions 320 and 340 face each other. Further, the battery cell 100, the first part 210, the second part 220, and the housing 500 may be packaged together by the pouch 10

The electrode tab 200 of the present disclosure is divided into the first part 210 that is disposed near the battery cell and the second part 220 that is disposed near the terminal. Referring to FIGS. 3 and 4, the first part extension 320 extends from the first part 210 and is inserted into the housing 500. The second part extension 340 extends from the second part 220 and is inserted into the housing 500. The housing 500 has the opening 520, such that the first part extension 320 and the second part extension 340 can be inserted into the housing 500 through the opening 520 so as to come into contact with each other in the housing 500.

Particularly, the cushion 400 having a reference level of internal pressure is inserted in the housing 500, and thus, the first part extension 320 and the second part extension 340 can come into close contact with each other by compression force of the cushion 400, and electricity is conducted through the first part extension 320 and the second part extension 340. Accordingly, in a normal state, the electricity is conducted through the first part 210 and the second part 220, and the battery circuit can be normally operated. However, when the battery cell 100 is expanded, the first part extension 320 and the second part extension 340 are separated from each other, and thus, the battery circuit is opened.

Described in detail, when the battery cell 100 is expanded, gas is generated in the battery cell by a reaction. Due to the gas generated in the battery cell, the pouch 10 is expanded. Further, when the internal pressure of the pouch 10 increases, the cushion 400 shrinks without resisting the internal pressure of the pouch 10, and therefore, the first part extension 320 and the second part extension 340 are separated from each other.

In the present disclosure, locations of the first part 210 and the second part 220 may be oppositely changed with each other. Described in detail, in another embodiment of the present disclosure, the high voltage battery for vehicles may include an electrode tab that is divided into a first part placed near a terminal and a second part placed near a battery cell. A pouch packages the battery cell therein. A housing is packaged in an interior of the pouch together with the battery cell and has an opening. A first part extension and a second part extension extend from the first part and the second part, respectively, are inserted into the housing through the opening, and come into contact with each other in the housing. A cushion is inserted in the housing and compresses the first part extension and the second part extension such that the first part extension and the second part extension come into close contact with each other.

Further, as shown in FIGS. 3 and 4, the first part extension 320, the second part extension 340 and the opening 520 of the housing 500 are provided with respective lockers 301. In other words, the first part extension 320 and the opening 520 of the housing 500 are provided with respective locking protrusions at corresponding portions, and the second part extension 340 and the opening 520 of the housing 500 are provided with respective locking protrusions at corresponding portions. Accordingly, even when the first part extension 320 and the second part extension 340 are separated from each other due to an increase in the internal pressure of the pouch 10, the locked state between the first part extension 320 and the housing 500 and the locked state between the second part extension 340 and the housing 500 are maintained without being released. Further, even when the internal pressure of the pouch 10 decreases, the separated state of the first part extension 320 and the second part extension 340 are maintained, so that the short circuit of the battery is maintained.

Figure 5:
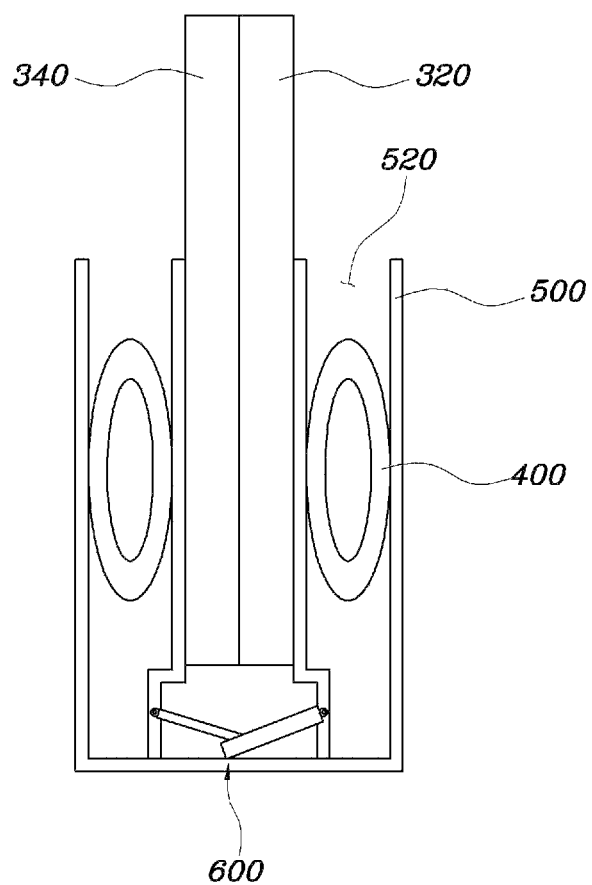
FIGS. 5 to 8 are sectional views illustrating an operation of a high voltage battery for vehicles according to another embodiment of the present disclosure.
Figure 6:
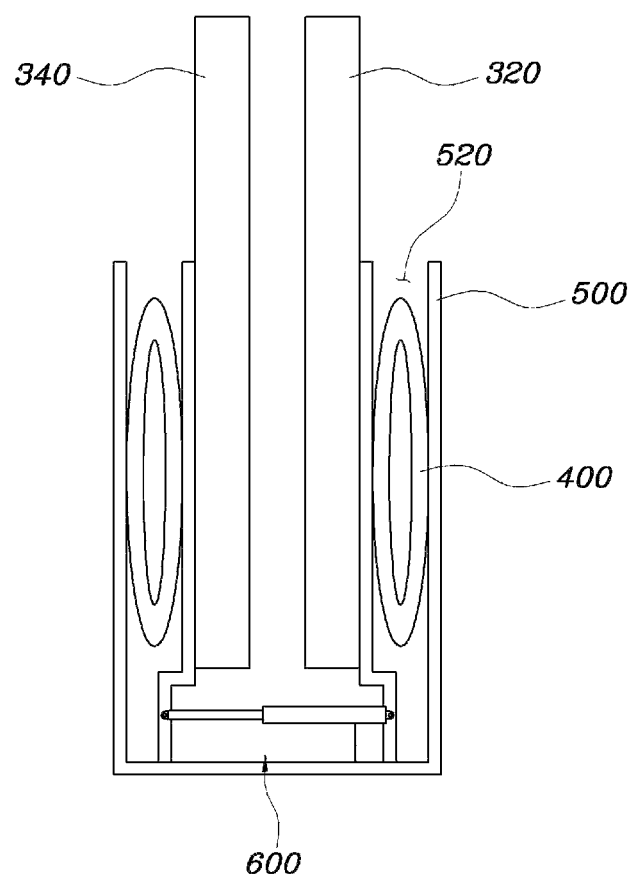

Further, as shown in FIGS. 5 and 6, another locker 600 may be provided in a gap between the first part extension 320 and the second part extension 340, and thus, once the first part extension 320 and the second part extension 340 are separated from each other, the separated state of the first part extension 320 and the second part extension 340 can be maintained by the locker 600.

Figure 7:
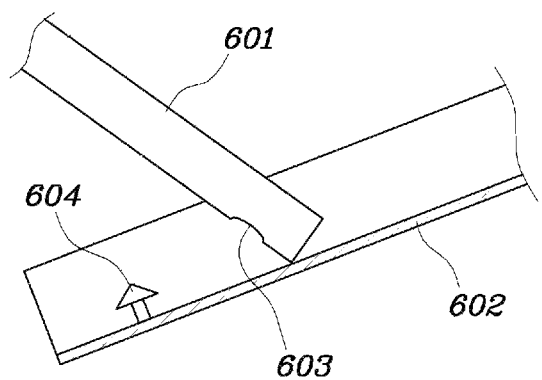
Figure 8:
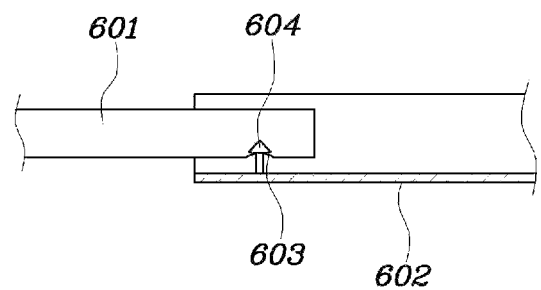

Specifically, as shown in FIGS. 7 and 8, two pipes 601 and 602 are provided in a gap between the first part extension 320 and the second part extension 340. When the first part extension 320 and the second part extension 340 are maintained in a closed contact state, the two pipes 601 and 602 are maintained in a folded state. However, when the first part extension 320 and the second part extension 340 are separated from each other, the two pipes 601 and 602 are opened and a locking protrusion 604 of the second pipe 602 is engaged with a locking hole 603 of the first pipe 601, so that, even when the internal pressure of the pouch 10 decreases, the separated state of the first part extension 320 and the second part extension 340 can be maintained due to the engagement of the locking hole 603 and the locking protrusion 604.

The high voltage battery for vehicles which has the above-mentioned construction has advantages. When the volume of a battery cell is abnormally expanded, and a variation in the pressure inside the cell is induced, a circuit of the battery is physically opened at a pressure equal to or higher than a reference level, thereby interrupting an external electric current and inducing cut-off of the circuit, so the present disclosure can realize cell level safety and pack voltage safety.

Unlike the conventional pouch type battery, in which, to avoid overcharge, a safety device designed to be limitedly used in a unit of module or package pack is used, the present disclosure provides an overcharge safety device that can realize cell level safety in a unit cell, and can interrupt an abnormal cell reaction in unit cells.

Further, the present disclosure adds the overcharge safety device in a surplus space between a jelly roll and a lead tab inside a pouch type unit cell, thereby realizing the cell level safety regardless of module type batteries or pack package type batteries.

Although the exemplary embodiment of the present disclosure has been described for illustrative purposes, those skilled in the art will appreciate that various modifications, additions and substitutions are possible, without departing from the scope and spirit of the disclosure as disclosed in the accompanying claims.

What is claimed is:

1. A high voltage battery for vehicles, comprising:
   an electrode tab that is divided into a first part disposed near a battery cell and a second part disposed near a terminal;
   a pouch that packages the battery cell therein;
   a housing that is packaged in an interior of the pouch together with the battery cell and has an opening;
   a first part extension and a second part extension that extend from the first part and the second part, respectively, that are inserted into the housing through the opening, and that come into contact with each other in the housing; and
   a cushion that is inserted in the housing and compresses the first part extension and the second part extension such that the first part extension and the second part extension come into close contact with each other.

2. The high voltage battery for vehicles as set forth in claim 1, wherein an interior of the pouch is vacuumized.

3. The high voltage battery for vehicles as set forth in claim 1, wherein when the battery cell is expanded, gas is generated in a space inside the pouch, and when an internal pressure of the pouch is increased higher than an internal pressure of the cushion, the first part extension and the second part extension are separated from each other.

4. The high voltage battery for vehicles as set forth in claim 1, wherein the cushion comprises two cushions that are inserted into an upper part and a lower part of the housing, respectively, and that compress the first part extension and the second part extension such that the first part extension and the second part extension come into close contact with each other in a central portion of the housing.

5. The high voltage battery for vehicles as set forth in claim 1, wherein the first part extension and the second part extension are configured as panel-shaped parts that extend from the first part and the second part, respectively, to a side in parallel to each other such that respective ends thereof face each other.

6. The high voltage battery for vehicles as set forth in claim 1, wherein the battery cell, the first part, the second part, and the housing are packaged together by the pouch.

7. The high voltage battery for vehicles as set forth in claim 1, wherein the first part extension, the second part extension, and the opening of the housing have respective lockers, such that, when the first part extension and the second part extension are separated from each other, a locked state between the first part extension and the housing and a locked state between the second part extension and the housing are maintained without being released.

8. The high voltage battery for vehicles as set forth in claim 1, wherein a locker is disposed in a gap between the first part extension and the second part extension, such that, once the first part extension and the second part extension are separated from each other, a separated state of the first part extension and the second part extension is maintained by the locker.

* * * * *